(12) United States Patent
Kao et al.

(10) Patent No.: US 10,335,692 B2
(45) Date of Patent: Jul. 2, 2019

(54) GAME HISTORY RECORDING APPARATUS AND METHOD FOR RECORDING AND INTERACTING WITH GAME HISTORY

(71) Applicant: ATEN International Co., Ltd., New Taipei (TW)

(72) Inventors: Kuo-feng Kao, New Taipei (TW); Hung-Chi Chu, New Taipei (TW); Hui-Ju Lin, New Taipei (TW); Chia-Chih Chen, Taoyuan County (TW)

(73) Assignee: Aten International Co., Ltd., New Taipei (TW)

(*) Notice: Subject to any disclaimer, the term of this patent is extended or adjusted under 35 U.S.C. 154(b) by 0 days.

(21) Appl. No.: 16/036,237

(22) Filed: Jul. 16, 2018

(65) Prior Publication Data
US 2018/0326309 A1    Nov. 15, 2018

Related U.S. Application Data

(62) Division of application No. 14/618,785, filed on Feb. 10, 2015, now Pat. No. 10,022,634.

(30) Foreign Application Priority Data

Oct. 31, 2014  (TW) .............................. 103137861 A

(51) Int. Cl.
*A63F 13/23* (2014.01)
*A63F 13/86* (2014.01)
(Continued)

(52) U.S. Cl.
CPC .............. *A63F 13/86* (2014.09); *A63F 13/23* (2014.09); *A63F 13/327* (2014.09); *A63F 13/497* (2014.09); *A63F 13/5375* (2014.09)

(58) Field of Classification Search
CPC ........ A63F 13/86; A63F 13/23; A63F 13/327; A63F 13/497; A63F 13/5375
See application file for complete search history.

(56) References Cited

U.S. PATENT DOCUMENTS

| 4,247,925 A | * | 1/1981 | Meshi ..................... G07C 1/28 273/237 |
| 5,259,626 A | | 11/1993 | Ho |

(Continued)

FOREIGN PATENT DOCUMENTS

| CN | 1254295 C | 5/2006 |
| CN | 102200990 A | 9/2011 |

(Continued)

OTHER PUBLICATIONS

Wikipedia, the free encyclopedia, "Hardware keylogger", printed from the internet, 6 pages.

(Continued)

*Primary Examiner* — Corbett B Coburn
(74) *Attorney, Agent, or Firm* — Chen Yoshimura LLP

(57) ABSTRACT

An apparatus for recording game history is coupled between a game host and a game console and performs a game history recording and interaction method. The apparatus communicates with the game host through a first wireless unit, and communicates with the game console through a second wireless unit, to receive game operation information generated from operations of the game console. The apparatus receives a video signal outputted by the game host through a video input port. The processing module is coupled to the wireless units and the video input port respectively and is used to obtain the game operation information from the wireless units and generate operation information images corresponding to the game operation information. The processing module superimposes the operation information images on the video signal corre- (Continued)

spondingly to form game history video data and outputs the superimposed game history video data to a display device for display.

1 Claim, 8 Drawing Sheets

(51) Int. Cl.
*A63F 13/497* (2014.01)
*A63F 13/5375* (2014.01)
*A63F 13/327* (2014.01)

(56) References Cited

U.S. PATENT DOCUMENTS

| | | | |
|---|---|---|---|
| 5,375,125 A | 12/1994 | Oshima et al. | |
| 5,779,548 A * | 7/1998 | Asai | A63F 13/10 463/1 |
| 6,095,920 A * | 8/2000 | Sadahiro | A63F 13/10 434/31 |
| 6,336,865 B1 | 1/2002 | Kinjo | |
| 6,699,127 B1 * | 3/2004 | Lobb | A63F 13/10 345/418 |
| 9,573,062 B1 | 2/2017 | Long et al. | |
| 9,911,350 B2 | 3/2018 | Rom et al. | |
| 2003/0069052 A1 | 4/2003 | Higashiyama et al. | |
| 2004/0157654 A1 | 8/2004 | Kataoka et al. | |
| 2004/0224741 A1 * | 11/2004 | Jen | A63F 13/10 463/6 |
| 2006/0148571 A1 * | 7/2006 | Hossack | A63F 13/10 463/43 |
| 2006/0253741 A1 | 11/2006 | Garakani | |
| 2008/0076546 A1 * | 3/2008 | Moyle | G07F 17/32 463/29 |
| 2008/0148165 A1 * | 6/2008 | Zalewski | A63F 13/12 715/764 |
| 2008/0194333 A1 | 8/2008 | Zalewski | |
| 2009/0048023 A1 | 2/2009 | Wang | |
| 2009/0258700 A1 | 10/2009 | Bright et al. | |
| 2010/0190554 A1 * | 7/2010 | Gagner | G07F 17/32 463/42 |
| 2010/0197407 A1 | 8/2010 | Kataoka et al. | |
| 2010/0234105 A1 * | 9/2010 | Gagner | G07F 17/32 463/30 |
| 2011/0237332 A1 | 9/2011 | Abiko | |
| 2011/0306395 A1 * | 12/2011 | Ivory | A63F 13/49 463/1 |
| 2012/0100916 A1 | 4/2012 | Zalewski | |
| 2013/0138734 A1 | 5/2013 | Crivello et al. | |
| 2013/0172081 A1 | 7/2013 | Shiina et al. | |
| 2014/0255881 A1 | 9/2014 | Rom et al. | |
| 2014/0302923 A1 * | 10/2014 | Sato | A63F 13/847 463/31 |
| 2016/0364029 A1 | 12/2016 | Miller et al. | |

FOREIGN PATENT DOCUMENTS

| | | |
|---|---|---|
| CN | 103870141 A | 6/2014 |
| TW | I226254 B | 1/2005 |
| TW | 201034727 A | 10/2010 |

OTHER PUBLICATIONS

Taiwanese Office Action, dated Feb. 25, 2016, in a counterpart Taiwanese patent application, No. TW 103137861.
Extended European Search Report and Written Opinion, dated Mar. 14, 2016, in a counterpart EP application, No. EP 15161893.1.

* cited by examiner

OMG

IMG

FRM

GAME HISTORY RECORDING APPARATUS AND METHOD FOR RECORDING AND INTERACTING WITH GAME HISTORY

BACKGROUND OF THE INVENTION

Field of the Invention

This invention relates to game history, and in particular, it relates to a game history recording apparatus, game history recording method and game history interaction method.

Description of the Related Art

Typically, regardless of which kinds of game host devices are used (e.g. X-BOX or PS4), players can obtain game strategy guide they desire, from the network or other sources, to use as reference during game play. Besides game strategy guides in text article format, there are game strategy guides in video format; such game strategy guide videos are typically provided by players by recording images of the game play using a computer or video recorder, and share them in real time via a network, or store them as archive and then share them.

Currently, typical game strategy guide videos mostly take images and sounds of game play, and record them for sharing. However, for players who wish to refer to game strategy guides, these videos lack the most practical and important information, which is the game operation information corresponding to the various images of the game strategy guide videos, such as which keys of the control console the player should press and the sequence of the key presses so that the characters of the game can pass the various challenges as in the game strategy guide videos. Thus, although players can find game strategy guide videos and play the videos, typically they can only watch the videos, or try to duplicate the various images of the game play they see in the videos through trial and error, which may be difficult and often unsuccessful.

SUMMARY OF THE INVENTION

Accordingly, the present invention is directed to a game history recording apparatus, game history recording method and game history interaction method which substantially obviates one or more of the problems due to limitations and disadvantages of the related art.

To achieve these and other advantages and in accordance with the purpose of the present invention, one embodiment of the present invention provides a game history recording device. In this embodiment, the game history recording device is coupled between the game host and the game console. It includes an interface module, a video input port, and a processing module. The interface module establishes a first connection with the game host and a second connection with the game console respectively, and receives game operation information generated from operations of the game console. The video input port receives a video signal outputted by the game host. The processing module is coupled to the interface module and the video input port respectively; it obtains the game operation information from the interface module and generates operation information images corresponding to the game operation information. The processing module superimposes the operation information images on the video signal correspondingly to form game history video data.

In one embodiment, the interface module is a wireless module, and includes a first wireless unit and a second wireless unit. The first wireless unit is coupled between the processing unit and the game host, to establish first wireless communication with the game host. The second wireless unit is coupled between the processing unit and the game console, to establish second wireless communication with the game console.

In one embodiment, the game history recording device further includes a video output module, coupled to the processing module, for outputting the game history video data to a display device for display.

In one embodiment, the game history recording device further includes a network transmission module, coupled to the processing module, for outputting the game operation information or the game history video data via a network.

In one embodiment, the game history recording device further includes a storage module, coupled to the processing module, for storing the game operation information or the game history video data.

In one embodiment, the game history recording device further includes an audio input port, coupled to the processing module, for receiving an external audio signal and forwarding it to the processing module, so that the processing module can further superimpose the external audio signal into the game history video data.

In one embodiment, the game history recording device further includes a video output port, coupled to the video input port, for directly outputting the video signal inputted from the video input port.

In one embodiment, the game operation information includes information representing a key press of at least one key of the game console, and a triggering time and duration of the key press.

In one embodiment, the processing module reads the game operation information stored in the storage module, and the game operation information includes multiple pieces of input information forming a time sequence. The processing module transmits the input information included in the game operation information to the game host, to enable the game host to output corresponding video signal.

In one embodiment, the processing module reads the game operation information stored in the storage module, and the game operation information includes multiple pieces of first input information forming a time sequence. The processing module receives, at a specified time point, a piece of second input information from the game console, compares the piece of second input information with a piece of the first input information corresponding to the specified time point, and outputs a recognition image based on the comparison result.

Another embodiment of the present invention provides a game history recording method, which includes the following steps: (a) providing a game history recording device, coupled between the game host and the game console; (b) respectively establishing a first connection between the game history recording device and the game host and a second connection between the game history recording device and the game console; (c) the game history recording device receiving a video signal from the game host; (d) the game history recording device receiving game operation information generated by the game console during game play; (e) the game history recording device generating operation information images corresponding to the game operation information, and correspondingly superimposing the operation information images on the video signals from the game host to form game history video data.

Yet another embodiment of the present invention provides a game history interaction method, which includes the following steps: (a) providing a game history recording device, coupled to the game console; (b) the game history recording device receiving game history video data or operation information image, as well as game operation information corresponding to the game history video data or the operation information image, the game operation information including multiple pieces of first input information forming a time sequence; (c) the game history recording device outputting the game history video data or the operation information image; (d) at a specified time point, the game history recording device receiving a piece of second input information from the game console; (e) the game history recording device comparing the piece of second input information with a piece of the first input information that corresponds to the specified time point; and (f) the game history recording device outputting a recognition image based on the comparison result of step (e).

Yet another embodiment of the present invention provides a game history interaction method, which includes the following steps: (a) providing a game history recording device, coupled to the game console and game host; (b) the game history recording device receiving game operation information, which includes multiple pieces of input information forming a time sequence; (c) the game history recording device receiving a start up command from the game console and informs the game host to start a game; (d) the game history recording device reading the game operation information and sending the plurality of pieces of input information to the game host; and (e) the game host outputting a video signal corresponding to the game operation information.

Compare to conventional technologies, the game history recording apparatus, game history recording method and game history interaction method have the following advantages:

(1) The game history recording device can simultaneously emulate a game console to the game host and emulate a game host to a game console, to respectively establish a connection with the game host and a connection with the game console.

(2) The game history recording device can receive game operation information from the game host and the game console, and can forward the information in synchrony.

(3) The game history recording device can superimpose operation information images corresponding to game operation information onto the game video, to form game history video data containing game operation information which displays key presses of the game console and their triggering time and duration.

(4) When the game host plays back the game history video data, the player can control the game console based on the instructions of the displayed operation information images, to practice the game.

(5) The game history recording device can directly read the game operation information, and directly forward game operations of the game operation information to the game host when the game is being played.

It is to be understood that both the foregoing general description and the following detailed description are exemplary and explanatory and are intended to provide further explanation of the invention as claimed.

DETAILED DESCRIPTION OF THE PREFERRED EMBODIMENTS

As required, a detailed illustrative embodiment of the present invention is disclosed herein. However, techniques, systems, operating structures and methods in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

One embodiment of the present invention is a game history recording device. In this embodiment, the game history recording decide is coupled to at least one game host and at least one game console. The types of the game hosts and game consoles are not limited to any particular types.

Figure 1:
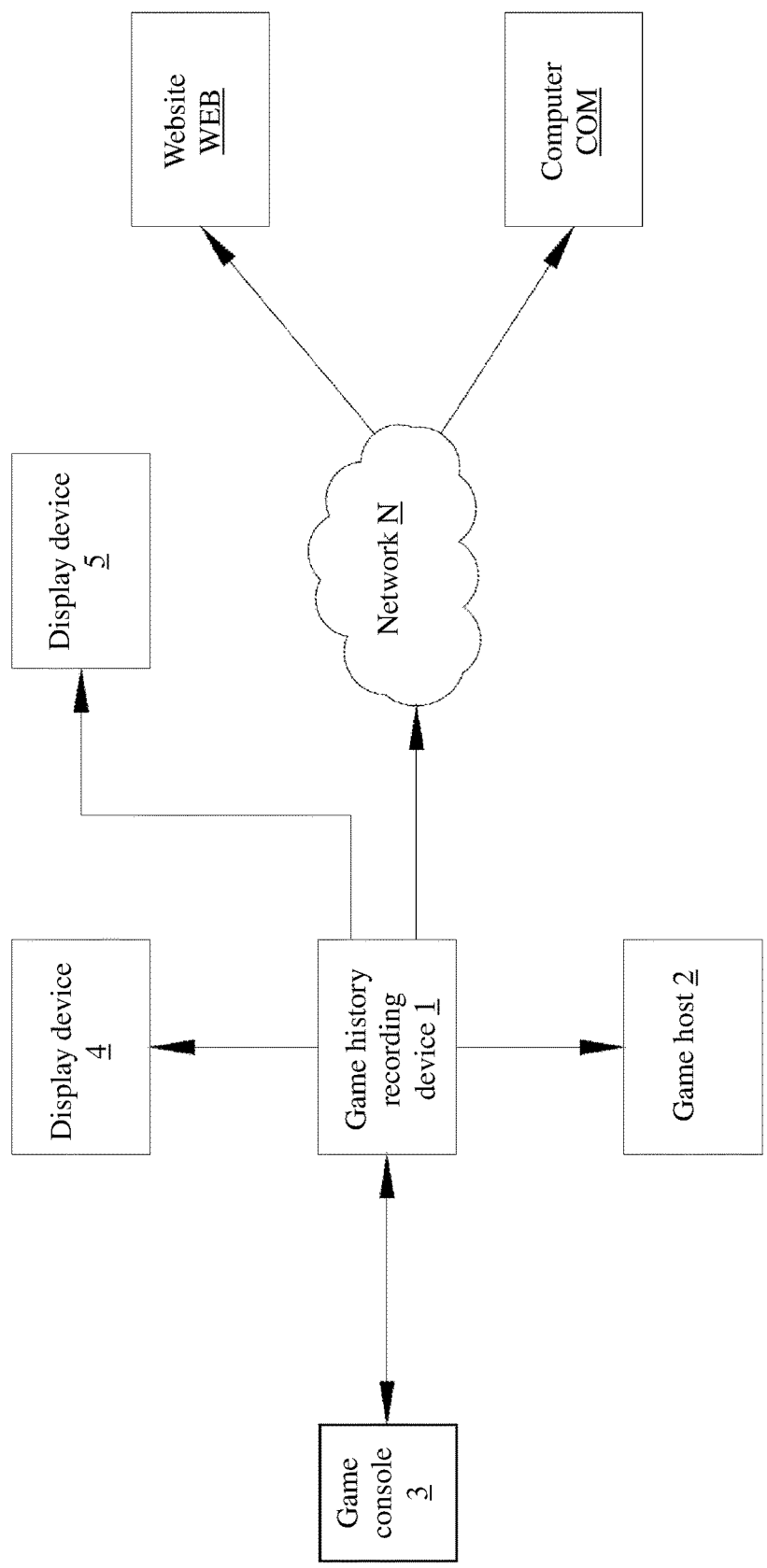
FIG. 1 schematically illustrates practical application environment of a game history recording device according to an embodiment of the present invention.

FIG. 1 schematically illustrates practical application environment of the game history recording device according to an embodiment of the present invention. As shown in FIG. 1, the game history recording device 1 can be respectively coupled to a game host 2, a game console 3 and a display device 4. In one embodiment, the game history recording device 1 can additionally be couple to a display device 5. In another embodiment, the game history recording device 1 can also be coupled to a computer COM and website WEB via a network N. In practice, the game host 2, game console 3, display device 4 and display device 5 are not limited to any particular kinds of devices, and the type of the network N is not limited to any type of network; any suitable devices or systems may be used.

Figure 2:
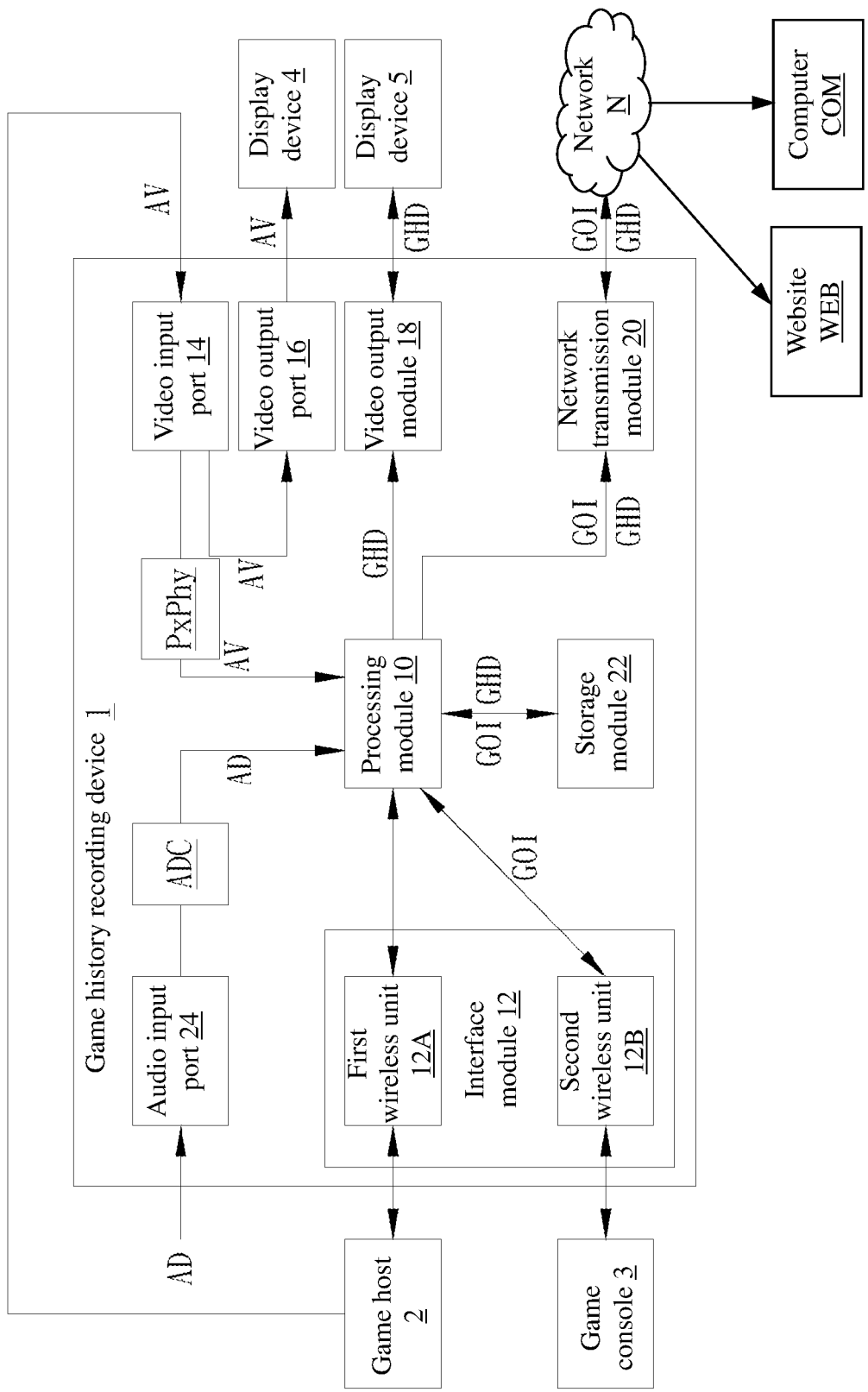
FIG. 2 is a detailed functional block diagram of the game history recording device of FIG. 1

FIG. 2 is a detailed functional block diagram of the game history recording device of FIG. 1. As shown in FIG. 2, the game history recording device 1 includes a processing module 10, an interface module 12, a video input port 14, a video output port 16, a video output module 18, a network transmission module 20, a storage module 22, an analogto-digital converter ADC, a decoding unit RxPhy, and an audio input port 24. The interface module 12 is a wireless module, and includes a first wireless unit 12A and a second wireless unit 12B.

The processing module 10 is coupled to the first wireless unit 12A and second wireless unit 12B of the interface module 12, the decoding unit RxPhy, the video output module 18, the network transmission module 20, the storage module 22 and the analog-to-digital converter ADC. The first wireless unit 12A of the interface module 12 is coupled to the processing module 10 and the game host 2. The second wireless unit 12B of the interface module 12 is coupled to the processing module 10 and the game console 3. The decoding unit RxPhy is coupled to the processing module 10 and the game host 2. The video output port 16 is coupled to the video input port 14 and the display device 4. The video output module 18 is coupled to the processing module 10 and the display device 5. The network transmission module 20 is coupled to the processing module 10 and the network N. The storage module 22 is coupled to the processing module 10. The audio input port 24 is coupled to the analog-to-digital converter ADC.

In this embodiment, the interface module 12 establishes a first wireless communication between the game history recording device 1 and the game host 2 via the first wireless unit 12A, and establishes a second wireless communication between the game history recording device 1 and the game console 3 via the second wireless unit 12B. The first and second wireless communication can use the same or different wireless communication protocols, such as Wi-Fi, Blue Tooth, or any other suitable wireless communication protocols.

In addition, if the game console 3 supports the game host 2, for example, if the game host 2 is a PS4 model and the game console 3 is a dedicated or compatible control device for it, then the game history recording device 1 simultaneously emulates a game console 3 that supports PS4 to the game host 2 via the first wireless unit 12A of the interface module 12, and emulates a PS4 game host 2 to the game console 3 via the second wireless unit 12B of the interface module 12. On the other hand, if the game console 3 does not support the game host 2, for example, if the game host 2 is a PS4 model while the game console 3 is an X-BOX model, then the first wireless unit 12A emulates a compatible PS4 game console to the game host 2 and the second wireless unit 12B emulates an X-BOX game host to the game console 3. The above examples are not limited to the above.

Because the first wireless communication between the game history recording device 1 and the game host 2 and the second wireless communication between the game history recording device 1 and the game console 3 are established, and the game history recording device 1 emulates a corresponding game console to the game host 2 and emulates a corresponding game host so the game console 3, the signal communication between the game host 2 and the game console 3 are now done via the interface module 12 of the game history recording device 1. The game history recording device 1 can receive, via the second wireless unit 12B of the interface module 12, game operation information GOI generated by the operation of the game console 3; the information is processed by the processing module 10 and stored in the storage module 22. The storage module may be a memory card or a built-in hard disk drive or memory of the game history recording device 1, but are not limited to the above.

In practice, the game operation information GOI may include information regarding key press of at least one key of the game console 3 as well as the triggering time and the duration of the key press of the at least one key. For example and without limitation, the game operation information GOI may include the operation information "the A key begins to be pressed at the first second and is continuously pressed for 3 seconds, and then immediately the B key is pressed three times consecutively."

The video input port 14 receives the video signal AV outputted by the game host 2, and forwards the video signal AV to the decoding unit RxPhy to decode the image and audio data, which are inputted to the processing module 10. In this embodiment, the video input port 14 is a video splitter, which splits the video signal from the game host 2 into two video signals; one of the two video signals is outputted to the decoding unit RxPhy, and the other is outputted to the video output port 16. When the video output port 16 receives the video signal AV from the video input port 14, the video output port 16 directly outputs the video signal AV to the display device 4, so that the display device 4 can display the video signal AV.

In one embodiment, when the processing module 10 receives the game operation information GOI via the second wireless unit 12B of the interface module 12 and receives the video signal AV via the video input port 14, the processing module 10 generates, based on the game operation information GOI, operation information images corresponding to the game operation information GOI, and correspondingly superimposes the operation information images onto the video signal AV to generate the game history video data GHD. In practice, the operation information images corresponding to the game operation information GOI may be, without limitation, images corresponding to the key characteristics of the game console 3.

Figure 3A:
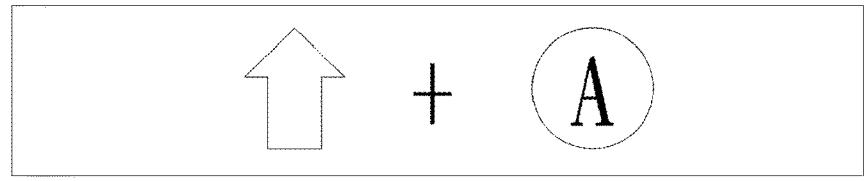
FIG. 3A illustrates an exemplary operation information image corresponding to game operation information.
Figure 3B:
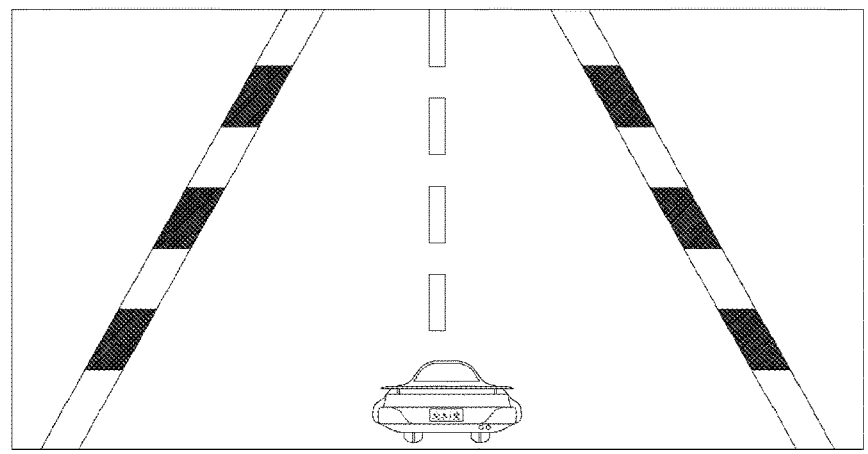
FIG. 3B illustrates an exemplary image of the video signal.

For example, suppose a first input within the game operation information GOI is the simultaneous pressing of the "up" and "A" keys of the game console 3, then the corresponding operation information image OMG will be that shown in FIG. 3A. Suppose an image IMG of the video signal AV from the game host 2 is as shown in FIG. 3B, then an image frame FRM of the game history video data GHD generated by superimposing the operation information image OMG shown in FIG. 3A and the image IMG of the video signal AV shown in FIG. 3B will be as shown in FIG. 3C.

Figure 3C:
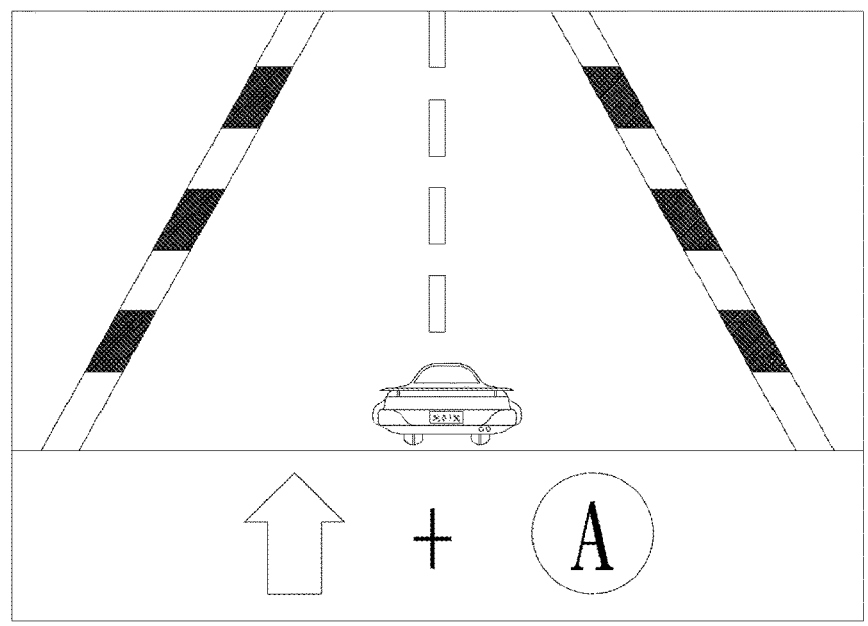
FIG. 3C illustrates an exemplary game history video data generated by superimposing the operation information image of FIG. 3A and the image of the video signal of FIG. 3B.
Figure 4A:
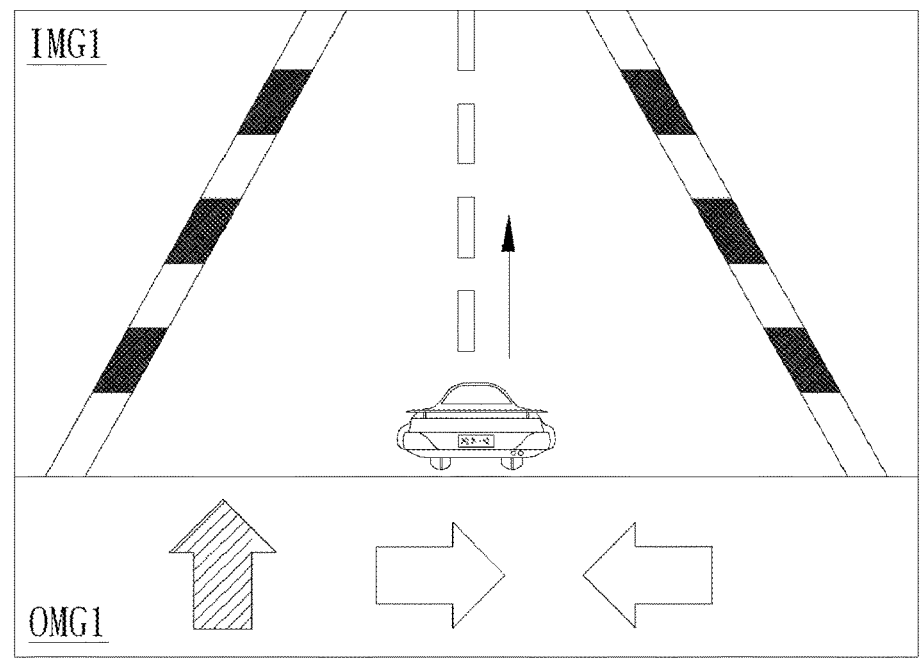
FIGS. 4A-4C illustrate exemplary consecutive images of the game history video data.
Figure 4B:
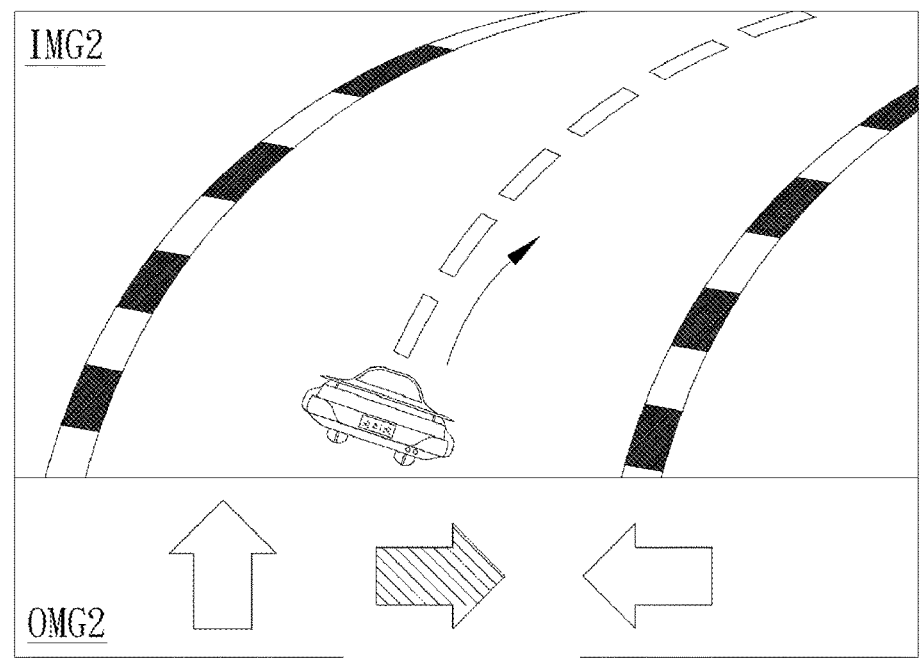
Figure 4C:
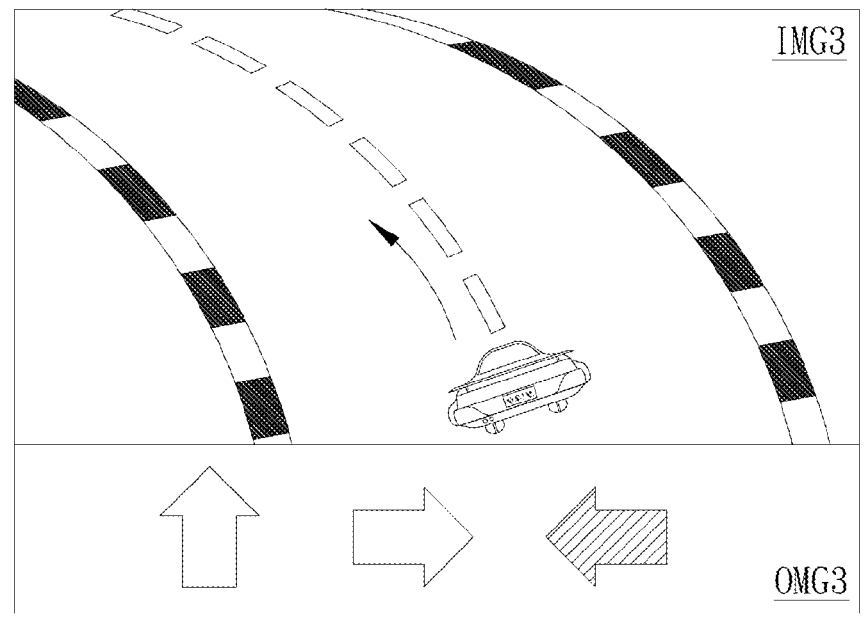

In addition to the manner of display shown in FIG. 3C, the game history video data GHD can also be displayed in the manners shown in FIGS. 4A to 4C. Referring to FIG. 4A, which shows a first image frame FRM1 of the game history video data GHD, at a first time point, the first image IMG1 of the video signal AV from the game host 2 shows a race car moving straight forward, so in the first operation information image OMG1, the "up" arrow on the left is highlighted, e.g. by filling it with a color or using a flashing effect, to remind the player who is watching the game history video data GHD to press the "up" key on the game console 3 at the first time point. In one embodiment, the time duration in which the "up" arrow is filled with the color may represent the time duration that the key should be pressed; in another embodiment, the time duration in which the "up" arrow is flashing may represent the time duration that the key should be pressed.

Next, referring to FIG. 4B, which shows a second image frame FRM2 of the game history video data GHD, at a second time point, the second image IMG2 of the video signal AV from the game host 2 shows a race car turning right, so in the second operation information image OMG2, the "right" arrow in the center is highlighted to remind the player who is watching the game history video data GHD to press the "right" key on the game console 3 at the second time point.

Similarly, referring to FIG. 4C, which shows a third image frame FRM3 of the game history video data GHD, at a third time point, the third image IMG3 of the video signal AV from the game host 2 shows a race car turning left, so in the third operation information image OMG3, the "left" arrow on the right is highlighted to remind the player who is watching the game history video data GHD to press the "left" key on the game console 3 at the third time point.

Thus, as shown in FIGS. 4A-4C, from the first time point, second time point to the third time point, the player who is watching the game history video data GHD will sequentially see the first image frame FRM1 which includes the first image IMG1 with a straight-moving race car and the first operation information image OMG1 with highlighted "up" arrow; the second image frame FRM2 which includes the second image IMG2 with a right-turning race car and the second operation information image OMG2 with highlighted "right" arrow; and the third image frame FRM3 which includes the third image IMG3 with a left-turning race car and the third operation information image OMG3 with highlighted "left" arrow.

Because the audio input port 24 can receive external audio signal AD and forward it to the processing module 10, the processing module 10 can additionally superimpose the external audio signal AD into the game history video data GHD, so that the game history video data GHD can include not only operation information images corresponding to game operation information GOI, but also the external audio signal AD. In practice, the external audio signal AD may include voice of the player that explains or provides hints about the game operation.

When the processing module 10 receives they game operation information GOI and generates the game history video data GHD, the processing module 10 may store the game operation information GOI and/or the game history video data GHD in the storage module 22, so that it can be retrieved later by the processing module 10 when needed; the processing module 10 can also export the game operation information GOI and/or game history video data GHD, using the network transmission module 20 via a network N, to the computer COM and/or website WEB. Using this mode, users can watch in real time the game play controlled by an expert player, and at the same time learn the timing of various key presses. Further, the processing module 10 can also output the game history video data GHD to the display device 5 via the video output module 18, so that the game history video data GHD is displayed on the display device 5. The above examples are exemplary and not limiting.

The game operation information GOI stored in the storage module 22 may include multiple pieces of first input information forming a time sequence; i.e., the game operation information GOI may include multiple pieces of first input information corresponding to multiple time points; for example and without limitation, the "press the up key," "press the right key," and "press the left key" respectively corresponding to the first, second and third time points in the example shown respectively in FIGS. 4A-4C.

In one embodiment, the game history recording device 1 can demonstrate a game play without the game console 3. That is, the processing module 10 reads the game operation information GOI stored in the storage module 22, and transmits the multiple pieces of first input information in the game operation information GOI to the game host 2, to enable the game host 2 to generate corresponding video signal AV based on the first input information. For example, using the above illustrated example, the game host 2 will, based on the pieces of first input information "press the up key," "press the right key," and "press the left key" etc., sequentially output the images of the video signal AV including the first image IMG1 with a straight-moving race car, the second image IMG2 with a right-turning race car and the third image IMG3 with a left-turning race car. The function of this embodiment can be used to allow expert players to share or explain games to beginning players, or using in demonstrations at exhibitions.

Figure 4D:
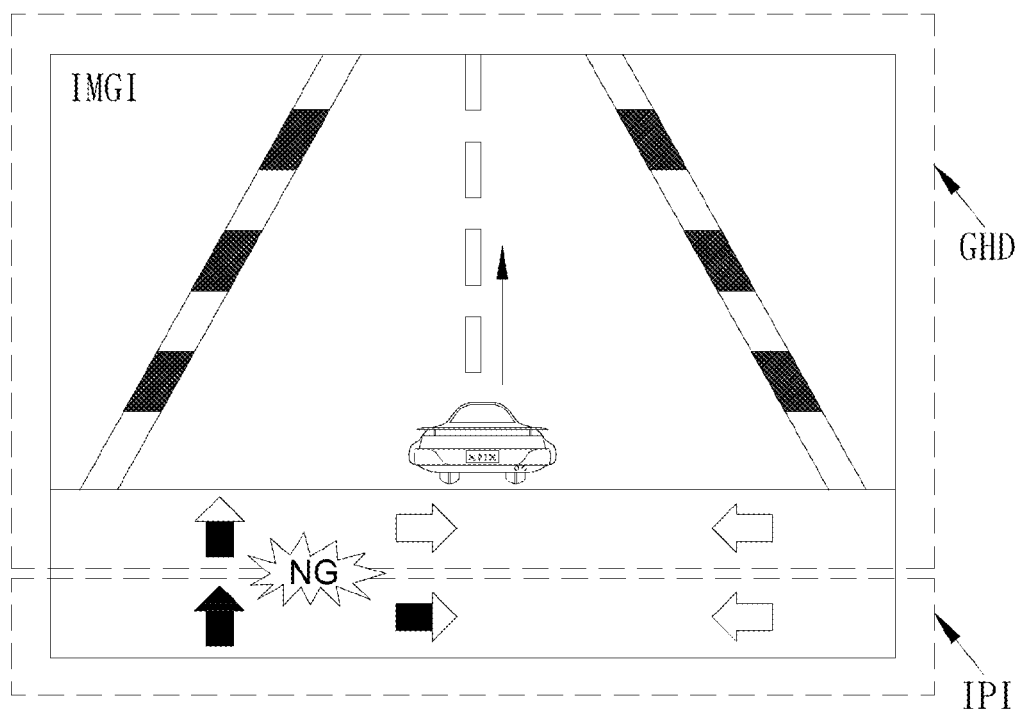
FIG. 4D illustrates an exemplary diagram of a comparison between the game history video data and the player's input data.

In another embodiment, the game history recording device 1 can be used in a learning mode by a user. In this embodiment, a non-expert user first obtains game operation information GOI and game history video data GHD previously recorded by expert players. The recorded game operation information GOI and the game history video data GHD may be stored in the storage module beforehand, or downloaded via the network. The processing module 10 reads the game operation information GOI and the game history video data GHD from the storage module 22. Then, the game history recording device 1 outputs the images of the game history video data GHD to the display device 5 shown in FIG. 2, and at a specified time point, receives a piece of second input information from the game console 3 via the second wireless unit 12B of the interface module 12. Then, the processing module 10 compares the piece of second input information with a piece of first input information, among the multiple pieces of first input information contained in the game operation information GOI, that corresponds to the specified time, and outputs a recognition image based on the comparison result. For example, as shown in FIG. 4D, the display device 5 displays the game history video data GHD, and simultaneously displays images IPI that correspond to the piece of second input information. At this time, the game history recording device 1 compares the piece of second input information with the particular piece of first input information, among the multiple pieces of first input information contained in the game operation information GOI, that corresponds to the specified time point, to determine if they match each other. If they do not match, a warning image is displayed, such as, without limitation, the warning image "NG" shown in FIG. 4D. Using this mode, when the game host 2 plays back the game history video data GHD, the player can control the game console 3 based on the instructions of the operation information images OMG displayed on the display, to practice playing the game; the processing module 10 can further determine whether the player's operations at particular time points are consistent with the instructions in the operation information images OMG, and informs the player via the recognition images.

Figure 5:
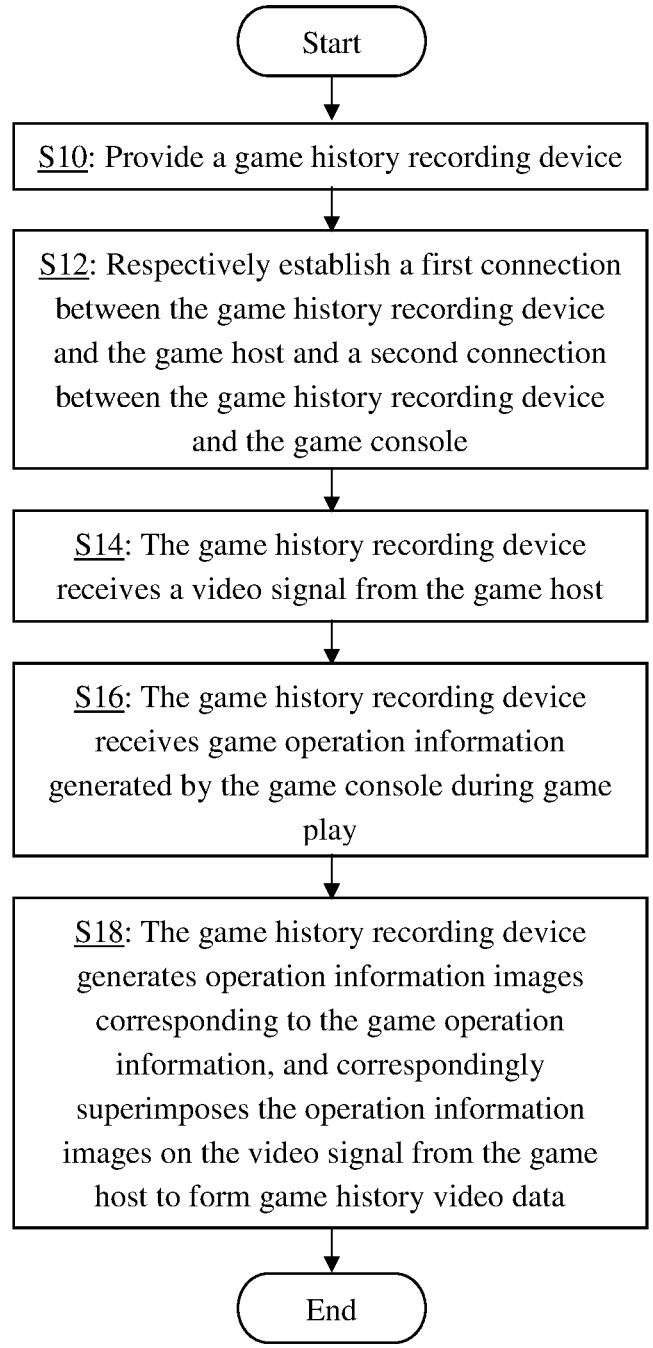
FIG. 5 is a flow chart showing a game history recording method according to another embodiment of the present invention.

Another embodiment of the present invention is a game history recording method. Refer to FIG. 5, which is a flow chart showing a game history recording method according to this embodiment. As shown in FIG. 5, in step S10, the game history recording method provides a game history recording device, and couples it between the game host and the game console. In step S12, the game history recording method respectively establishes a first connection between the game history recording device and the game host and a second connection between the game history recording device and the game console. In step S14, the game history recording device receives a video signal from the game host. In step S16, the game history recording device receives game operation information generated by the game console during game play. In step S18, the game history recording device generates operation information images corresponding to the game operation information, and correspondingly superimposes the operation information images on the video signal from the game host to form game history video data. The game history video data can be transmitted to a network server, to allow users to download for viewing; or, the game history video data can be outputted to another display device connected to the game history recording device.

In practice, the game history recording device may receive external audio signals and superimpose the external audio signals to the game history video data. When the game history recording device generates the game history video data, the game history recording method can store the game operation information and/or the game history video data, or export the game operation information and/or the game history video data to a display device or the network.

Figure 6:
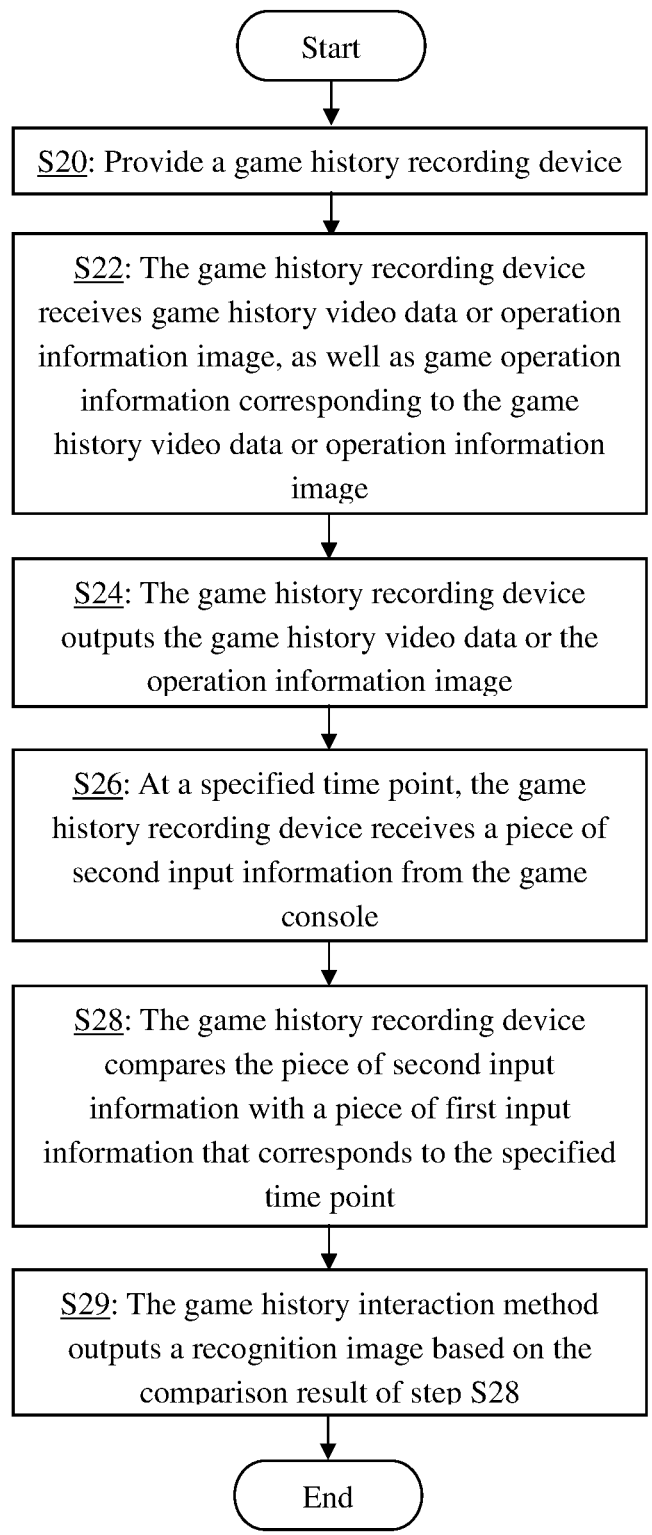
FIG. 6 is a flow chart showing a game history interaction method according to another embodiment of the present invention.

Yet another embodiment of the present invention is a game history interaction method. Refer to FIG. 6, which is a flow chart showing a game history interaction method. As shown in FIG. 6, in step S20, the game history interaction method provides a game history recording device, coupled to the game console. In step S22, the game history recording device receives game history video data or operation information image, as well as game operation information corresponding to the game history video data or operation information image, the game operation information including a plurality of pieces of first input information forming a time sequence. In step S24, the game history recording device outputs the game history video data or the operation information image. In step S26, at a specified time point, the game history recording device receives a piece of second input information from the game console. In step S28, the game history recording device compares the piece of second input information with a piece of first input information that corresponds to the specified time point. In step S29, the game history interaction method outputs a recognition image based on the comparison result of step S28.

Figure 7:
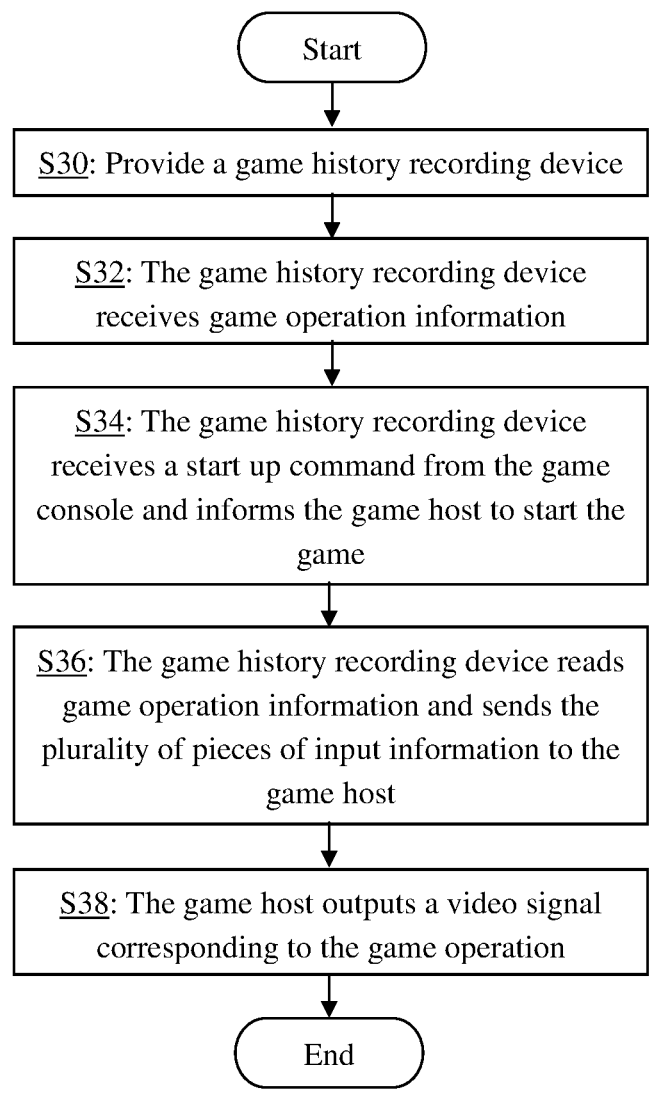
FIG. 7 is a flow chart showing a game history interaction method according to yet another embodiment of the present invention.

Yet another embodiment of the present invention is another game history interaction method. Refer to FIG. 7, which is a flow chart showing a game history interaction method. As shown in FIG. 7, in step S30, the game history interaction method provides a game history recording device, coupled to the game console and the game host. In step S32, the game history recording device receives game operation information, which includes a plurality of pieces of input information forming a time sequence. In step S34, the game history recording device receives a start up command from the game console and informs the game host to start the game. In step S36, the game history recording device reads game operation information and sends the plurality of pieces of input information to the game host. In step S38, the game host outputs a video signal corresponding to the game operation information.

Compare to conventional technologies, the game history recording device, game history recording method and game history interaction method have the following advantages:

(1) The game history recording device can simultaneously emulate a game console to the game host and emulate a game host to a game console, to respectively establish a connection with the game host and a connection with the game console.

(2) The game history recording device can receive game operation information from the game host and the game console, and can forward the information in synchrony.

(3) The game history recording device superimpose operation information images corresponding to the game operation information onto the game video, to form game history video data containing game operation information which displays key presses of the game console and their triggering time and duration.

(4) When the game host plays back the game history video data, the player can control the game console based on the instruction of the displayed operation information images, to practice the game.

(5) The game history recording device can directly read the game operation information, and directly input game operations of the game operation information to the game host when the game is being played.

The detailed descriptions above explain the preferred embodiments and do not limit the invention to these embodiments. It will be apparent to those skilled in the art that various modification and variations can be made in the game history recording device, game history recording method and game history interaction method of the present invention without departing from the spirit or scope of the invention. Thus, it is intended that the present invention cover modifications and variations that come within the scope of the appended claims and their equivalents.

What is claimed is:

1. A game history interaction method, comprising:
(a) providing a game history recording device coupled to a game console and a game host;
(b) the game history recording device receiving, from a storage device or a network, game operation information, which includes a plurality of pieces of input information forming a time sequence;
(c) the game history recording device receiving a start up command from the game console and informs the game host to start a game;
(d) the game history recording device reading the game operation information from the storage device or the network, and sending the plurality of pieces of input information to the game host, without sending any further information from the game console to the game host;
(e) the game host outputting a video signal corresponding to the game operation information to a display device; and
(f) the display device displaying the video signal outputted by the game host.

* * * * *